United States Patent [19]
Loiselle

[11] Patent Number: 5,636,591
[45] Date of Patent: Jun. 10, 1997

[54] WILD BIRD SUET FEEDER SYSTEM AND METHOD

[76] Inventor: Guy J. Loiselle, 1471 Greenville Dr., Bellingham, Wash. 98226

[21] Appl. No.: 430,767

[22] Filed: Apr. 27, 1995

[51] Int. Cl.⁶ ................................................. A01K 39/01
[52] U.S. Cl. ...................... 119/51.03; 119/57.8; 426/630
[58] Field of Search ..................... 119/51.03, 52.2, 119/52.3, 57.8, 57.9; 426/105, 93, 630

[56] References Cited

U.S. PATENT DOCUMENTS

| | | |
|---|---|---|
| D. 70,794 | 4/1926 | Held . |
| 1,092,314 | 4/1914 | White . |
| 1,123,501 | 1/1915 | Dreibelbis . |
| 1,221,019 | 4/1917 | Bowdish . |
| 2,235,959 | 3/1941 | Copeman . |
| 2,306,312 | 12/1942 | Hyde . |
| 3,200,790 | 8/1965 | Anderson . |
| 3,537,429 | 11/1970 | Regan . |
| 3,664,303 | 5/1972 | Baensch . |
| 3,852,487 | 12/1974 | Van Werven et al. ............... 426/105 |
| 3,922,352 | 11/1975 | Tewey et al. ........................ 426/105 |
| 4,731,249 | 3/1988 | Findley ................................ 426/630 |
| 4,942,043 | 7/1990 | Sander ................................. 426/93 |
| 5,052,342 | 10/1991 | Schneider . |

*Primary Examiner*—Todd E. Manahan
*Attorney, Agent, or Firm*—Robert B. Hughes; Hughes, Multer & Schacht

[57] ABSTRACT

A system and method for feeding wild birds, where there is a base member (i.e. wood log) having recesses formed therein. A bird feed cartridge having a casing and suet or other bird material contained therein has an end portion thereof inserted into the recess and cut off so that the end portion of the food cartridge is retained in the recess. After a bird eats the bird food in the recess then a second end portion of the cartridge is inserted into the recess.

14 Claims, 1 Drawing Sheet

U.S. Patent  Jun. 10, 1997  5,636,591
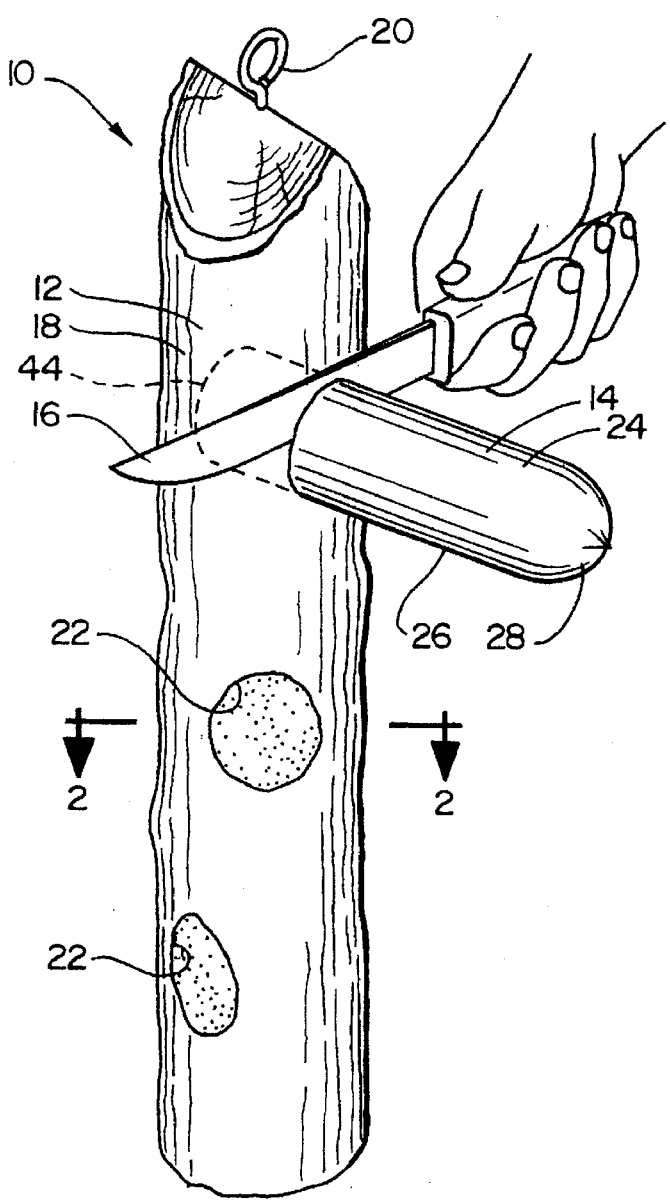
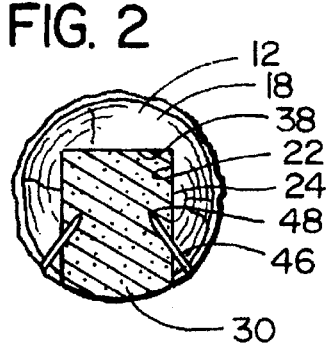
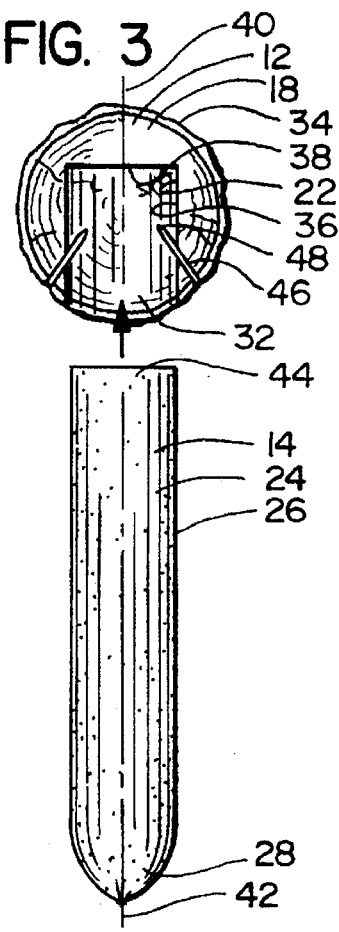
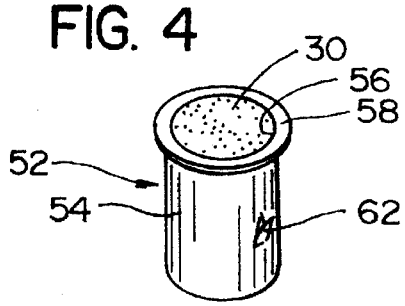
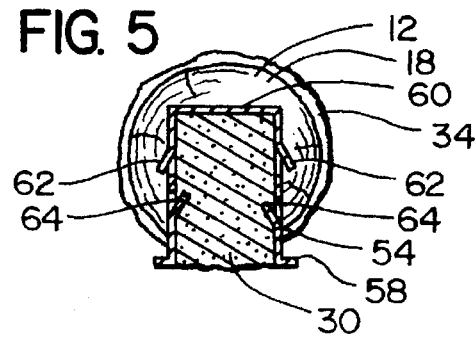

WILD BIRD SUET FEEDER SYSTEM AND METHOD

BACKGROUND OF THE INVENTION

A. Field of the Invention

The present invention relates to a system and method for feeding wild birds, and more particularly to, such a system where a cohesive bird feed, such as suet can be conveniently shaped and provided in a convenient form so as to be inserted into a base member in successive portions for periodic placement and replacement of the bird feed for consumption by the birds.

B. Background Art

There are various types of bird feed, and also devices for effectively providing food for consumption by wild birds. Bird seed is a common type of food fed to wild birds, and quite commonly the seed is fed to the birds by placing it in a container having a dispensing opening which controls the flow of the bird feed into a feeding location, so that as the birds remove the feed, more feed flows into a location to be accessible to the birds.

Another form of bird feed is suet which can be obtained as a by-product from a butcher shop or possibly from a commercial meat processing plant. The suet generally comprises fat particles from kidneys and other fatty products from meats, and the suet generally forms a cohesive mass, such as hamburger meat that has a relatively high fat content. The suet can be mixed to contain bird seed such as peanuts, chips, sun flower chips, etc. The suet is then usually placed at some bird feeding location, possibly by scooping it out of a container or package with a spoon or a knife and depositing it in some bird feeding receptacle, platform or the like.

A search of the U.S. Patent literature has disclosed a number of devices or systems for feeding birds, and these are the following:

U.S. Pat. No. 5,052,342 (Schneider) shows a suet-seed cake holder in which there is a panel 12, with an opening into which the suet-seed cake is placed, and a perch to accommodate the feeding bird.

U.S. Pat. No. 3,664,303 (Baensch) shows a holder for a short cylinder of animal food. In this patent the device is a float supported fish food holder.

U.S. Pat. No. 3,537,429 (Regan) shows a holder for cylindrical animal food. Ears of corn are placed on nails mounted on a rotatable plate U.S. Pat. No. 3,200,790 (Anderson) shows an elongated member with openings in which blocks of animal food is placed.

U.S. Pat. No. 2,306,312 (Hyde) shows a bird feeder provided with openings into which cups of bird food may be placed. The device can be configured for clinging birds such as wood peckers, by roughened areas 30, in FIG. 1.

U.S. Pat. No. 2,235,959 (Copeman) shows a holder for suet cakes.

U.S. Pat. No. 1,123,501 (Dreibelbis) provides a holder for food for farmyard birds. The device holds food off the gound.

U.S. Pat. No. 1,221,019 (Bowdish) shows a bird food holder that is secured to a tree, and can be refilled as needed.

U.S. Pat. No. 1,092,314 (White) shows a tree supported bird feed holder.

U.S. Pat. No. D-70,794 (Held) shows the design for a bird feeder that appears to be in the shape and form of a length of wood, limb, or log.

There are a number of considerations or concerns in the feeding of wild birds. One is that the bird feed should desirable be placed at a location and in an apparatus or form so that it is reasonably accessible to the birds, but is accessible to other animals either not at all, or at least with substantial difficulty. Squirrels are a particular problem in making sure that a substantial portion of the bird feed is actually fed to the birds, since squirrels are highly mobile in moving up to and between elevated locations, and also rather ingenious in finding their way to various bird feeding locations.

Another consideration is that the person who is providing feed for the birds is able to do so conveniently. Also, it is desirable that the feeding system be arranged so that it does not take a great deal of skill or practice for the person to effectively use this system.

SUMMARY OF THE INVENTION

Accordingly, it is a general object of the present invention to provide a bird feeding system and method which is particularly adapted to effectively provide a cohesive bird feed, such as suet or suet with other bird feed contained therein, with this system and method having a balance of desirable features, such as convenience for the person feeding the birds, and also effective placement and dispensing of the bird feed so that it can be consumed by the wild birds.

In the method of the present invention there is first provided a base member which has at least one bird feeding recess with an outer end opening. The recess has a predetermined cross-sectional configuration and a lengthwise axis extending inwardly from the outer end opening. The base member is arranged to enable a bird to perch adjacent to the base member at a feeding location adjacent to the recess.

There is provided a feed cartridge of a predetermined shape, having a length dimension and a length-wise axis. The cross-sectional configuration of the feed cartridge corresponds generally in size and shape to the cross-sectional configuration of the bird feeding recess. The cartridge has a first end and a second end and comprises the bird feeding material which is sufficiently yielding so as to be able to be sliced, but sufficiently stable to maintain its shape under a moderate applied force.

A first end portion of the feed cartridge is inserted into the bird feeding recess in a manner that the first end portion is retained in the recess.

Then the cartridge is sliced at a location proximate to, or moderately spaced from, the outer opening of the recess to leave at least the first end portion of the cartridge positioned in the feeding recess to be available to be eaten by birds.

At a later time, a second end portion of the cartridge can be inserted into the recess to be positioned to be eaten by the birds.

In the preferred form, the recess has a cylindrical cross sectional configuration.

The cartridge, in the preferred form, has an outer containing layer and a quantity of the bird feed material positioned within the containing layer. Desirably, the feed material has a feed component selected from a group consisting of suet, suet-like material, and mixtures thereof. Also, the feed material can comprise a particulate feed component mixed with the first feed component.

As a further feauture, the feed cartridge can be retained in the opening by mechanical retaining means extending into the recess. More specifically, the feed cartridge can be retained in the recess by barb means extending into the recess.

A preferred form of the base member is that it comprises a wood piece, which can be, or shaped as, a wood log, having the recess formed therein. Or the base member could be mde of plastic, resin or a combination thereof. Nail means can then be inserted through the wood piece and into the recess to retain the feed cartridge.

In a specific form, the feed cartridge comprises a suet-like feed material positioned in a sausage-like casing to form a generally cylindrical feed cartridge.

In another version of the present invention, there is further provided an insert having a sidewall corresponding to the cross-sectional configuration of the recess. The insert is placed into the recess, so as to be retained therein, and the end portion of the feed cartridge is inserted into the recess and then sliced off.

The system of the present invention comprises the base member and the feed cartridge as described above, where these are used in combination, as described above.

Also, the invention comprises a base member particularly adapted to be used in the system and method, and also the feed cartridge itself adapted to be used in this system and method.

Other features will become apparent from the following detailed description.

BRIEF DESCRIPTION OF THE DRAWING

FIG. 1 as an isometric view of the system of the present invention where a cartridge of bird feed has been placed in a base member and a portion of the bird feed cartridge is being sliced off to remain in the feeding location of the base member;

FIG. 2 is a sectional view taken along line 2—2 of FIG. 1 illustrated showing a portion of the bird feed cartridge positioned in the base member;

FIG. 3 shows the base member, in cross section as shown in FIG. 2, but showing the end portion of a bird feed cartridge about to be inserted into the recess in the base member;

FIG. 4 is an isometric view of a modified form of the present invention where a retaining insert is used to position the bird feed portion in the base member; and FIG. 5 is a sectional view similar to FIG. 2, showing the insert of FIG. 4 positioned in the recess in the base member and containing the bird feed portion.

DESCRIPTION OF THE PREFERRED EMBODIMENTS

With reference to FIG. 1, the combination 10 of the present invention comprises a base member 12, a bird feed block or a cartridge 14, and a severing tool, such as a knife 16.

In the particular embodiment shown herein, the base member 12 is conveniently formed as a wood log 18 which has at its upper end an attaching member 20, which in this particular instance is a circular eyelet with a screw end inserted in the upper end of the log 18. Alternatively the base member 18 could be made of plastic, resin material, or some other suitable material. The log 18 has a plurality of cylindrical recesses 22 formed therein. Normally, these recesses 22 would be between about 1.5 to 2.5 inches in diameter, and have a depth of about 1.5 to 2.0 inches.

As shown herein, the log 18 does not provide for a perch for the birds, and is thus adapted for the feeding of birds (e.g. woodpeckers) who can simply perch themselves by gripping the vertical surface of a tree with their feet. Alternatively, it would also be possible to provide a peg or small platform by which the birds could perch themselves to the base member 12.

The bird feed block or cartridge 14 is in the preferred form of this invention made in the general configuration of a sausage, where there is an outer containing skin or casing 24 which in the filled condition taken a shape having a cylindrical sidewall 26 and a rounded closed end portion 28. The casing 24 is filled with a cohesive bird feed such as a quantity of suet 30. The term "suet" is to be used in its broader sense to refer to a bird feed which is sufficiently yielding so that it can be formed and sliced, but is also sufficiently firm and cohesive so that it is able to maintain its shape when only a moderate amount of pressure is exerted thereon. The suet itself can be conventional suet used as bird feed, such as being made up of the fat, kidneys, and other waste products in a meat processing plant. Further, various other food components could be added to the suet.

The suet that is obtained from the butcher shop or processing plant in a raw form should be rendered for a period of time, such as a half hour or so. This process is well known in the prior art, and the temperature of the suet is raised to a sufficiently high level to kill the bacteria and to cause the suet to become liquid. Then this would be strained to take out the gristle, which would not be acceptable for bird feed. This would prevent the feed from soon becoming rancid.

In the following description, the block or cartridge 14 will simply be referred to as a "cartridge" since in the preferred form it will be made up of the outer skin 24 and the suet-like bird feed 30 in the form of a cartridge. However, within the broader scope of the present invention, it is to be understood that it would be possible, for example, to form the cartridge 14 in some modified configuration that would be consistent with its use in the present invention. For example, a coating material (or even the outer portion of the bird feed material itself) could conceivably be processed in some particular manner to provide it with an outer layer that would be sufficiently cohesive and somewhat resistant to abrasion and or deformation as to function properly in the present invention.

The cartridge 14 can be formed in a conventional manner in which sausage is made as a food product for human consumption, and there is in the prior art machinery particularly adapted for this purpose. Thus, the skin or casing 24 can be initially provided in the usual manner and could be the same as the skin which would be used in making a sausage product for human consumption. Then the suet or suet-like bird feed is pressed into the skin casing 24 so as to fill the casing 24 and provide its cylindrical shape.

As indicated above, the base member 12 (i.e. the log 18) is formed with a plurality of recesses 22. Each recess 22 has an opening 32 adjacent to the outer side surface 34 of the log 18, a cylindrical interiorly facing a sidewall 36 and an end wall 38. For purposes of description, the recess 22 shall be considered as having a lengthwise center axis 40, and the feed cartridge 14 shall also be considered as having a lengthwise center axis 42.

In the preferred configuration, the sidewall 36 is symmetrically formed in a cylindrical shape around the lengthwise axis 40, and the cartridge 14 is also symmetrically formed as a cylinder around its center axis 42. The diameter of the cartridge 14 is the same as (or nearly the same as) the diameter of the matching recess 22. Also, the axis 40 of each recess 22 is generally horizontally aligned.

To describe the method of the present invention, the log 18 is suspended by the attaching member 20 at a suitable bird feeding length location. Then the bird feed cartridge 14 is positioned in alignment with its related recess 22 (as shown in FIG. 3) and then moved into its related recess 22 so that a first end portion 44 of the cartridge 14 becomes positioned in the recess 22. Then the knife 16 is used (as shown in FIG. 1) to sever the end portion 44 from the rest of the cartridge 14. Generally there is sufficient frictional engagement between the surface of the skin 24 portion of the cartridge end portion 44 and the recess sidewall 36 so that the end portion 44 of the cartridge 14 remains securely positioned in the recess 22. In like manner, successive end portions of the cartridge 14 can be placed in other recesses 22 so as to be properly positioned therein.

The birds eat the suet from each cartridge portion 42 by perching themselves against the log with the beak of the bird adjacent to the recess 22, and then extracting portions of the suet-like bird feed from the recess 22. After a period of time when the food in any recess 22 has been substantially completely eaten, then the remainder of the cartridge portion 44 is removed and a second end portion 44 of the cartridge 14 is inserted into the recess 22 and cut off in the same manner as described above.

Another feature of the present invention is illustrated in FIGS. 2 and 3. It may well be desirable to position the end portion 44 of the bird feed cartridge 14 more securely in the recess 22. With the base member 12 being made up primarily of the log 18, this further securing of the cartridge portion 44 can be accomplished quite easily by simply pounding in one or more nails 46 into the log at a location adjacent to the recess 22, with the nails being slanted into the recess 22 toward the center axis 40 of the recess 22. Thus, as can be seen in both FIGS. 2 and 3, the tips 48 of the nails protrude at a slant into the recess 22 toward the end wall 38. Thus, when the cartridge 14 is pushed into the recess 22, portions of its sidewall 26 are deformed or depressed moderately as these pass by the nail tips 48. If it is attempted to pull the severed end portion 44 out of the recess 22, the nail tips 48 would offer strong resistance.

A further embodiment of the present invention is shown in FIGS. 4 and 5. The base member 12 and the feed cartridge 14 are provided as in the embodiment shown in FIGS. 1–3. However, there is additionally provided a cylindrical insert 52 having a sidewall 54, an open end portion 56, and a circumferential lip 58 extending a short distance radially outwardly from the sidewall 54 adjacent to the opening 56. The other end of the insert 54 is closed by an end wall 60.

The sidewall 54, is formed with a pair of outwardly directed retaining tabs 62 which can simply be made as wall portions which have been severed along three sides and pushed outwardly a short distance. Alternatively, these retaining tabs 62 could be eliminated, and a pair of nails 46 could be driven into the log 18 to bear against the sidewall 54 and retain the insert 52 in place.

Additionally, a pair of retaining tabs 64 can be formed from the sidewall 54 by making U-shaped cuts at a couple of locations in the sidewall 54 and pushing these inwardly so as to extend inwardly and rearwardly from the insert sidewall 54.

The diameter of the recess sidewall 34 is sized to snugly engage the outer surface of the sidewall 54, and the diameter of the cartridge 36 is sized so that it fits snugly within the inner surface 66 of the sidewall 54.

The insert 52 is positioned within a related recess 22 and can remain in that position for an extended period of time, with portions 44 of the cartridge 14 being placed in the insert 52 from time to time. The use of such an insert 50 may provide certain advantages, such as being able to be cleaned.

It is to be recognized that various modifications could be made in the embodiments of the present invention shown herein without departing from the basic teachings thereof.

What is claimed:

1. A method of providing feed for birds, said method comprising:
   a) providing a base member which has at least one bird feeding recess with an outer end opening, said at least one recess having a predetermined cross sectional configuration and a lengthwise axis extending inwardly from the outer end opening, said base member being arranged to enable a bird to perch adjacent to the base member at a feeding location adjacent to the at least one recess;
   b) providing a feed cartridge of bird feed of a predetermined shape, having a length dimension and a lengthwise axis, and a cross sectional configuration corresponding generally in size and shape to the cross sectional configuration of the at least one bird feeding recess, said cartridge having a first end and a second end, and comprising a bird feed material which is sufficiently yielding so as to be able to be sliced, but sufficiently stable to maintain its shape under moderate force;
   c) inserting a first end portion of the feed cartridge into the at least one bird feeding recess in the manner that the first end portion is retained in said at least one recess;
   d) slicing said cartridge at a location proximate to, or moderately spaced from, the outer opening of the at least one recess to leave at least the first end portion of the cartridge positioned in the at least one feeding recess to be available to be eaten by birds.

2. The method as recited in claim 1, wherein at a later time inserting a second end portion of the cartridge into said at least one recess to be positioned to be eaten by birds.

3. The method as recited in claim 1, wherein said at least one recess has a cylindrical cross sectional configuration.

4. The method as recited in claim 3, wherein said cartridge has an outer containing layer and a quantity of bird feed material positioned within said containing layer.

5. The method as recited in claim 1, wherein said feed material has a first feed component selected from a group consisting of suet, suet-like material, and mixtures thereof.

6. The method as recited in claim 5, wherein said feed material also comprises a particulate feed component mixed with said first feed component.

7. The method as recited in claim 1, wherein said feed cartridge is retained in said opening by a mechanical retaining means extending into said at least one recess.

8. The method as recited in claim 1, wherein said feed cartridge is retained in said at least one recess by barb means extending into said at least one recess.

9. The method as recited in claim 1, wherein said base member is made from a material selected from a group consisting of plastic, a resin or combination thereof.

10. The method as recited in claim 1, wherein said feed cartridge comprises a suet-like feed material positioned in a sausage-like casing to form a generally cylindrical feed cartridge.

11. The method as recited in claim 1, wherein there is an insert having a sidewall corresponding to the cross sectional configuration of said at least one recess, and said insert is placed into said at least one recess so as to be retained therein, and the end portion of the feed cartridge is inserted into said at least one recess to be retained therein.

12. The method as recited in claim 1, wherein said base member is made from a material which comprises wood.

13. A feeding system for birds, comprising:
a) a base member which has at least one bird feeding recess with an outer end opening, said at least one recess having a predetermined cross sectional configuration and a lengthwise axis extending inwardly from the outer end opening, said base member being arranged to enable a bird to perch adjacent to the base member at a feeding location adjacent to the at least one recess;
b) a feed cartridge of bird feed, having a predetermined shape, and having a length dimension and a lengthwise axis, and a cross sectional configuration corresponding generally in size and shape to the cross sectional configuration of the at least one bird feeding recess, said cartridge having a first end and a second end, and comprising a bird feed material which is sufficiently yielding so as to be able to be sliced, but sufficiently stable to maintain its shape under moderate force;
c) the length dimension of the feed cartridge being substantially greater than a depth dimension of the at least one bird feeding recess, in a manner that an end portion of said cartridge can be placed in said recess and sliced off to leave a portion of the cartridge in the recess, and at a later time a further end portion of the cartridge can be inserted in the recess and sliced off to provide yet another portion of bird feed in the recess;
d) an insert having a sidewall corresponding to the cross sectional configuration of said at least one recess, said insert placed into said recess so as to be retain ed therein, and the end portion of the feed cartridge being inserted into said recess to be retained therein.

14. The system as recited in claim 13, wherein said base member is made from a material comprising wood.

\* \* \* \* \*